US008442991B2

(12) United States Patent
Ramani et al.

(10) Patent No.: US 8,442,991 B2
(45) Date of Patent: May 14, 2013

(54) INFORMATION ACCESS DEVICE AND NETWORK

(75) Inventors: Srinivasan Ramani, Karnataka (IN); Andrea Colaco, Goa (IN); Srinivasu Godavari, Karnataka (IN); Anjaneyulu Seetha Rama Kuchibhotla, Karnataka (IN); Badri Narayanan Ranganathan, Chennai (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 721 days.

(21) Appl. No.: 12/410,464

(22) Filed: Mar. 25, 2009

(65) Prior Publication Data
US 2009/0259663 A1   Oct. 15, 2009

(30) Foreign Application Priority Data

Apr. 15, 2008   (IN) .............................. 925/CHE/2008

(51) Int. Cl.
*G06F 7/02*     (2006.01)
*G06F 17/30*    (2006.01)

(52) U.S. Cl.
USPC ............ 707/765; 707/755; 707/759; 707/770

(58) Field of Classification Search .................. 707/3, 9, 707/10, 104.1, 999.003, 999.009, 999.01, 707/999.107, 755, 770, 784, 759, 765, 804; 719/328, 330, 331, 332; 717/106
See application file for complete search history.

(56) References Cited

U.S. PATENT DOCUMENTS

| 6,430,553 | B1 * | 8/2002 | Ferret .................................. 1/1 |
| 2002/0116550 | A1 * | 8/2002 | Hansen ......................... 709/330 |
| 2006/0149719 | A1 * | 7/2006 | Harris ................................ 707/3 |
| 2007/0002050 | A1 * | 1/2007 | Aoki et al. ..................... 345/428 |
| 2008/0104035 | A1 * | 5/2008 | Uchikawa .......................... 707/3 |
| 2009/0157693 | A1 * | 6/2009 | Palahnuk ......................... 707/10 |
| 2009/0243812 | A1 * | 10/2009 | Yamamoto ................. 340/10.41 |
| 2009/0313245 | A1 * | 12/2009 | Weyl et al. ......................... 707/5 |

* cited by examiner

*Primary Examiner* — Bruce Moser

(57) ABSTRACT

An information access device is disclosed comprising an interface for connecting the information access device to a network; a further interface for providing the information access device with a string of information request indicators; an interpretation layer for extracting an information source from the string and for generating an instruction for triggering a different application of the device to retrieve the information from the information source; and a processor for executing the generated instruction.

21 Claims, 2 Drawing Sheets

INFORMATION ACCESS DEVICE AND NETWORK

CROSS-REFERENCE TO RELATED APPLICATION

This application claims priority to Indian Patent Application No. 925/CHE/2008, entitled "INFORMATION ACCESS DEVICE AND NETWORK", filed on Apr. 15, 2008, which is hereby incorporated by reference in its entirety.

The present invention relates to an information access device comprising an interface for connecting the information access device to a network.

The present invention further relates to a network comprising such an information access device.

Nowadays, information access devices, e.g. Internet-connected computers, can be considered complex systems because their use requires a variety of knowledge and skills such as typing, having an understanding of the user interface of the system, interpreting displayed diagnostic messages, and coping with any unexpected behavior of the software (SW)/hardware (HW). It can be difficult for the average user of such devices to cope with such unexpected behavior, for instance because the complexity of the system.

Moreover, due to the ever-increasing complexity of the user interface of such devices, the average user may struggle to fully understand how to operate the user interface, for instance because this user does not have a full understanding of how the user interface interacts with the underlying system components.

Hence, the increasing complexity of such information access devices and their user interfaces can jeopardize the efficient use of such devices. This is especially cumbersome in an environment where the use of the device is shared by multiple users, e.g. in schools. This can be further exacerbated by detrimental effects on the start-up time and the responsiveness of such a device caused by its increasing complexity.

It is not only domestic users of such devices who are hampered by their complexity. For instance, sophisticated users may also have difficulty to work in an efficient manner on keyboard-based devices, for instance when dealing with complex scripts such as the syllabic Devanagari script.

Hence, there exists a need for an information access device that facilitates a more informal way of retrieving information.

Figure 1:
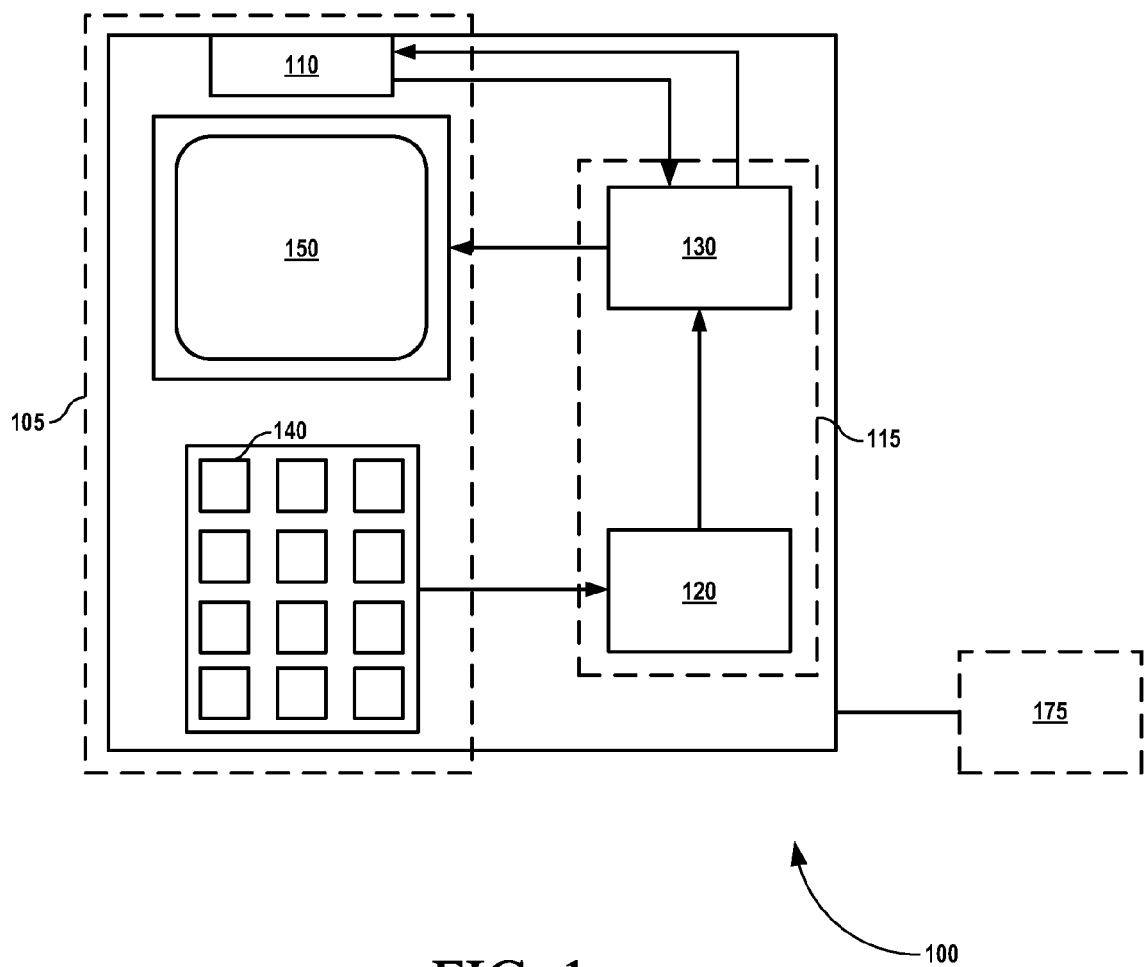
Figure 2:
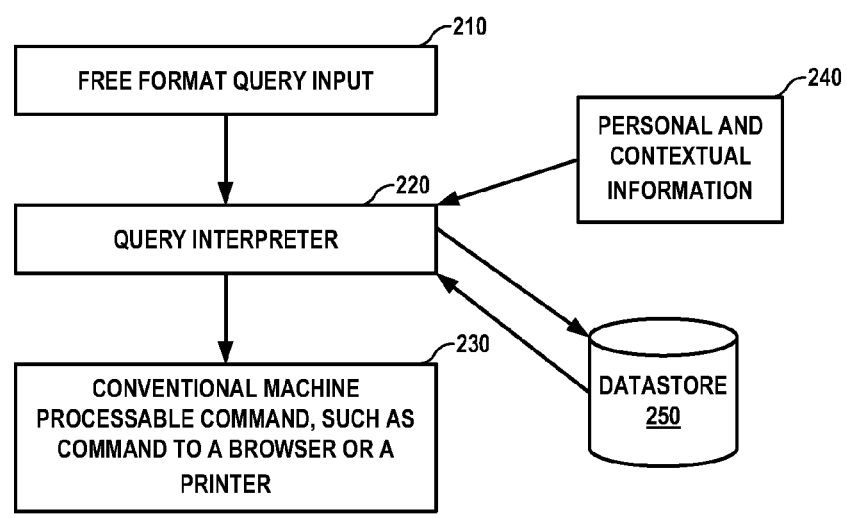
Figure 3:
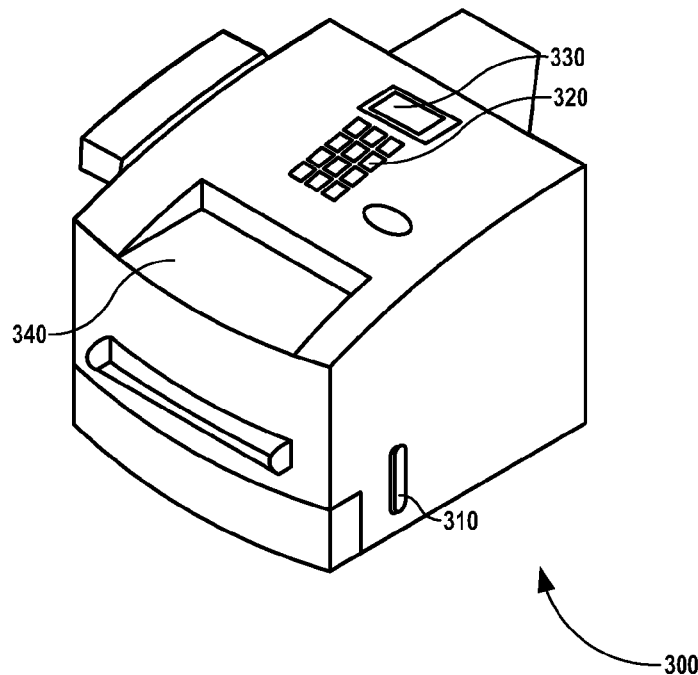
Figure 4:
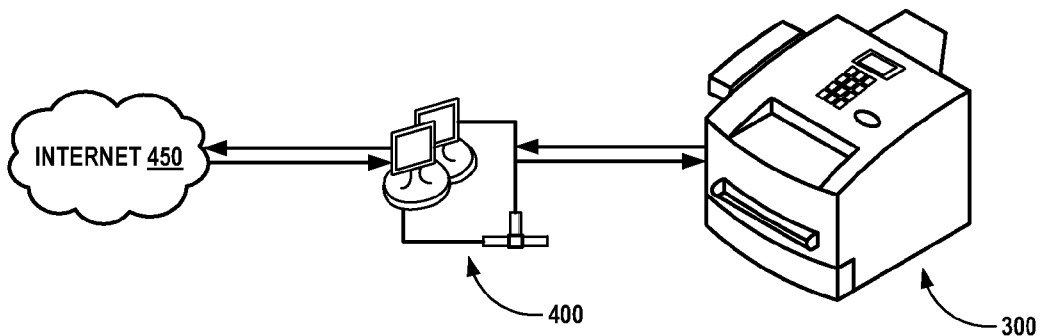
Figure 5:
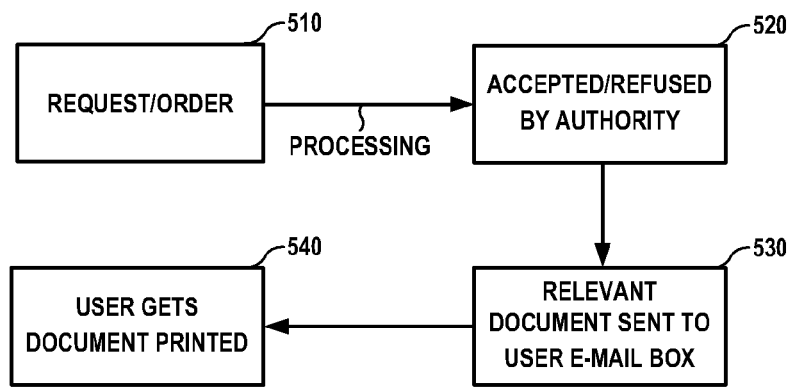

Embodiments of the invention are described in more detail and by way of non-limiting examples with reference to the accompanying drawings, wherein:

FIG. 1 schematically depicts an information access device in accordance with an embodiment of the present invention;

FIG. 2 schematically depicts an aspect of an information access device in accordance with an embodiment of the present invention FIG. 3 schematically depicts an information access device in accordance with another embodiment of the present invention;

FIG. 4 schematically depicts an information access device of FIG. 2 in a network; and FIG. 5 schematically depicts a service provided with an information access device in accordance with an embodiment of the present invention.

It should be understood that the Figures are merely schematic and are not drawn to scale. It should also be understood that the same reference numerals are used throughout the Figures to indicate the same or similar parts.

In FIG. 1, an information access device 100 according to an embodiment of the present invention is depicted. The information access device 100 comprises an interface 110 for connecting the information access device 100 to a network (not shown). The interface 110 may be arranged to physically connect the information access device 100 to such a network, e.g. a local area network (LAN) port, or may be arranged to connect the information access device 100 to the network in a wireless fashion. The interface 110 may be arranged to directly connect the information access device 100 to the network, or may be arranged to connect to a server, e.g. a router, that is connected to the network.

The device further comprises a further user interface 140 for allowing a user to provide the device 100 with URLs and free format queries, i.e. a string of words and symbols (information request indicators). The user may also use "shortcuts", that is strings which are interpreted and mapped onto local resources on the LAN or to URLS. The further interface 140 may comprise a keyboard or any other suitable input means, e.g. a microphone connected to voice recognition software, a key pad, a touch pad, a touch screen and so on. The further interface 140 is coupled to an interpretation layer 120 for extracting an information source from the string, and for generating an instruction for retrieving the information from the information source. The device 100 further comprises a processor 130 for executing the instruction generated by the interpretation layer 120. In an embodiment, the interpretation layer 120 is embedded as a SW layer on the processor 130.

The information access device 100 may be seen as a light usage computer (LUC). Such a device is easier to use, and may be cheaper to manufacture than computers controlled by fixed format commands. Moreover, such a device can be easily shared between multiple users, which makes it attractive for use in multi-user environments such as schools.

The device allows a user to provide the device with keywords and "shortcuts" via the further interface 140 without having to comply with syntactical rules of an application running on the processor 130 for retrieving the information. Such information request indicators (IRIs) are provided to the interpretation layer 120, which is configured to evaluate the IRIs, and to instruct the processor 130 to retrieve the information upon identifying what the requested information is, e.g. by visiting an information source on the network and to retrieve the information from this source. In an embodiment, the instruction generated by the interpretation layer 120 causes another application running on the processor 130 to retrieve this information. The interpretation layer 120 may be a part of the operating system of the information access device 100.

The processor 130 will subsequently provide the user with the requested information in any suitable form, e.g. by means of displaying the information on a display 150, which may be any suitable display type, by means of printing the requested information, by means of storing an electronic document, e.g. a word processing document, or by means of sending an e-mail to the user, and so on. Hence, the information access device 100 allows a user to request access to an information source without having to launch an application on the information access device 100. It will be appreciated that the information access device 100 of the present invention allows for a much more direct way of accessing information when compared with a conventional personal computer. On a PC, the user would have to login into the PC and launch a web browser. Using the browser, the user would then navigate to a weather site and access the required information, whereas with the information access device 100, the user can simply provide a few IRIs to the device 100, after which the device 100 automatically retrieves the requested information by intelligent interpretation of the provided keywords.

In an embodiment, the interpretation layer 120 is configured to interpret IRIs as "shortcuts". To this end, the interpretation layer 120 may comprise a database stored in a data storage device (not shown) of the device 100, e.g. a memory or a hard-disk. The interpretation layer 120 may be configured to map shortcut names onto strings that are syntactically meaningful for an application to run on the processor 130. For instance, the shortcut 'John' provided on the further interface 140 will be interpreted by the interpretation layer 120 as a shortcut, and subsequently extended to 'John.Doe@yahoo.com' upon a positive match of the shortcut in the database of shortcuts. This may for instance trigger the interpretation layer 120 to instruct the processor 130 to open an e-mail in an e-mail management program. This mapping of an IRI onto a well defined source of information can also be done on a server accessed by the LUC rather than on the device itself.

The interpretation layer 120 may be further configured to interpret IRIs as search strings, in a style similar to the search criteria inserted into an Internet search engine. This may trigger the interpretation layer 120 to instruct the processor 130 to perform a search, resulting in the processor 130 or the identification layer 120 identifying a set of local resources or frequently used Internet resources. The search mechanism may even use an external search engine. The interpretation layer 120 or the processor 130 is arranged to display the plurality of potential information sources to a user, and is further arranged to display appropriate information in response to the user selecting an information source.

The user may select the desired information source by means of a select button, which may form a part of the further interface 140 or may be a separate button. The user could use a touch screen if the LUC is provided with one. For instance, the IRI "weather Bangalore" may provide the user with a list of URLs from which the user may choose the preferred information source. Alternatively, the LUC may map the IRI to a single URL using a pre-stored mapping. Such storage would be particularly useful if the information access device 100 is designed to recognize the user, e.g. when the user is required to log onto the information access device 100, or has to provide some form of identification, in which case the information access device 100 may store a user profile for the user, which may include (recently) visited information sources. Upon receiving IRIs from that user, the interpretation layer 120 may consult the user profile, which may obviate the need to present the user with a list of information resources.

The user may indicate in the input IRI how he or she wants the information presented, e.g. "print Bangalore weather forecast", which is interpreted by the interpretation layer as a request to visit the Internet and find a website presenting a weather forecast for Bangalore. The keyword 'print' is recognized as a functional term, and is interpreted as a request to print the retrieved information onto a printable medium.

Moreover, the mapping between the IRI and content to be retrieved allows a user to define an IRI in one type of language script, e.g. a Roman script, and retrieve content in another language script, e.g. Hindi.

In an embodiment, the interpretation layer 120 is also configured to interpret IRIs in the form of traditional URLs as used on the Internet, including URLs that correspond to a service on the network. Such URLs can also correspond to services that are data sources. For instance, the device 100 could connect to a service that provides stationery such as graph paper or letterhead templates. This data may be in a format facilitating printing on the device 100 directly, e.g. XHTML-Print.

A list of non-limiting examples of IRIs that can be interpreted by the interpretation layer 120 is given below. The IRIs are shown in italic.

www.cnn.com/weather/Bangalore, i.e. a URL to web-based information;

local.tests.VI.physics.3, an IRI which denotes access to a resource on a host computer, for tests in physics for a student of class VI covering chapter 3.

Inbox; a shortcut command to open an e-mail management program;

Print E-mail 4-5, a shortcut command to print e-mails numbered 4 and 5 in the inbox;

Scan and file Assignment 4, a shortcut command referring to a document on the scanner platen which is to be scanned, with its image stored in a file named "Assignment 4". The interpretation layer 120 will recognize terms 'scan' and 'file' as operations to be performed by the information access device 100.

Scan and e-mail John, which is a shortcut request to access the information in the form of a paper document placed on the scanner platen, i.e. requesting scanning of the document, and subsequent sending to the (e-mail) address identified by the nickname (John) provided for by the shortcut mechanism;

E-mail teacher Assignment 4, an IRI requesting a stored file (Assignment 4) to be sent to an email address indicated by the shortcut 'teacher';

Weather, requesting a web access to a weather report for a preset location, or the current location in case of the information access device 100 comprising location detection technology, e.g. GPS;

Railway Schedule, requesting access to railway time table for arrivals/departure from a particular location. Arrival and/or departure location may be specified as well in the string, as in "Railway Schedule Delhi";

Emergency phone numbers, requesting access to a list of emergency phone numbers from a network resource; and Clean up and print, which is a request to perform an image processing step on an image placed on a scanner prior to printing the image.

The information access device 100 may be a modular device. For instance, the functionality for executing the instructions extracted from the string of information request indicators may be available on a network server (not shown) that can be connected via the network interface 110. The further interface 140 may be a part of a cellular device 105, e.g. a mobile phone, PDA, and so on, further comprising the display 150. The cellular device 105 may further comprise the network interface 110, e.g. an interface for implementing a communication standard such as an UMTS or 3-G. The interpretation layer 120 including pre-stored personalization and localization information, and the processor 130 may be a part of a further modular device 115, which may be connected to the cellular device 105 via a cable or by means of a wireless connection such as a Bluetooth, a Firewire connection or any other suitable wireless connection. In an alternative embodiment, the cellular device 105 only comprises the network interface 110. Other suitable partition schemes over two or more modules will be apparent to the skilled person.

The information access device 100 may further comprise one or more peripheral devices 175, e.g. a scanner, a printer, a credit card reader for enabling payment for the use of the information access device 100, a bar code reader, a fingerprint reader, a media player, and so on. For instance, an MP3 player may be connected via a USB port, after which a string 'store Madonna Ray of Light' can invoke the connection to a music download service, retrieval of the requested content and storage of the content on the MP3 player. Alternatively, one or more of the peripheral devices 175 may also be an integral part of the information access device 100.

In an embodiment, the information access layer 120 may be implemented as shown in FIG. 2. A query interpreter 220 is arranged to receive an IRI in the form of a free format input query 210 from a user of the information access device 100. The query interpreter 220 further receives information from a first database 240, which is typically arranged to store a user profile and/or location information identifying the geographical location of the user and the information access device 100. The query interpreter 220 interprets the IRI using the information from the first database 240, and tries to match the free format input query to a formatted query such as an e-mail access instruction, an Internet access instruction, which may be in the form of a URL and so on, as explained earlier. To this end, the query interpreter 220 searches a further database 240 that stores said instructions, and retrieves a suitable instruction from the further database 240.

In case the query interpreter 220 finds multiple matching instructions, the query interpreter 220 is arranged to provide the user with the retrieved matching instructions, e.g. by displaying the matching instructions on a display, such that the user can select which of the matching instructions is the instruction intended by the user. Hence, the user is presented with an easy-to-use interface in which information access instructions can be fed to the information access device 100 by an easy to use IRI. In the context of the present invention, an instruction may be any command that triggers a device to retrieve information. The IRI may also trigger a sequence of instructions to be executed by the information access device 100.

The IRI may be mapped on to a subset of instructions available to a conventional computer. This has the advantage that the information access device 100 may be implemented on devices that have less computing power than conventional computers.

In an embodiment, the information access device is an all-in-one printer 300, as shown in FIG. 3. The printer 300 comprises a network interface 310, a keypad 320 operating as the interface for providing the string of information request indicators, a display 330 and a scanner 340. The printer 300 may further comprise the interpretation layer 120 and processor 130 shown in FIG. 1. Alternatively, the interpretation layer 120 and processor 130 are part of a computer connected to the printer 300. The printer may be network connected, as shown in FIG. 4, where the printer 300 is connected to the Internet 450 via a local area network 400. Other suitable ways of connecting the printer to a network are equally feasible.

The information access device 100, e.g. the printer 300, may provide a preview mechanism that shows the retrieved information including the number of retrieved pages prior to printing. This allows the user to abandon printing in case the user finds the retrieved pages unsuitable for printing.

The printer 300 may be part of the aforementioned modular information access device 100. For instance, the printer 300 may be combined with a cellular device 105, with the cellular device 105 providing the interface 120, e.g. a keyboard and a display 140, interpretation layer (which may also be implemented in software). Such a system could offer a common user interface to the information access device, thereby making the system easy to use.

It will be appreciated that the aforementioned embodiments of the information access device 100 are non-limiting examples only. Other examples are equally feasible. For instance, the access device 100 may be a portable device, suitable for use by e.g. commuters or travelers. The information access device 100 may be mounted in a car to provide a "print on the move" facility. The results of actions initiated on the further interface 140, which may be either on a single module information access device 100 or on a connected cellular device 105 in case of a multi-module information access device 100, could be printed for the user as a convenient and durable record for the motorist.

In addition to the shortcuts and customization facilities, the information access device 100 could use "current location" information obtained from the cellular device 105. As explained previously, appending such location information to the search string vastly reduces the required amount of information to be provided by the user to obtain certain types of information, thus improving the usability of the device. The usability may be further enhanced if the further interface 140 comprises speech recognition software, thus allowing the user to provide the string of information request indicators in a hands-free manner.

The interpretation layer 120 may be configured to apply different types of interpretations for different users. For instance, the interpretation layer 120 may be customized to a relevant group of users, e.g. a class of students, or a family, to map sets of keywords onto information from default sources of information. This customization can include considerations such as the location, customs, and level of learning of a particular person or a group. This customization could be done by pre-storing the preferred sources of information which would be accessed using free format queries, e.g. IRIs. This list may be stored on the information access device 100 or on a local host in case multiple devices 100 are to share this customization.

As mentioned before, the information access device 100 may make content available for a charge. For instance, in case of the network interface 110 comprising a cellular telephony interface, the retrieved content may be charged on the basis of usage measured (e.g. connection time monitored, the volume of information retrieved) by the telephony service provider. Such an option would for instance allow any mobile phone user to use an information access module 115 at an Internet cafe, and charge the usage of the module 115 to his mobile phone account.

In an embodiment, the user would communicate an ID number of the module 115 to be used to the telephony service provider and receive a password valid for one session with that module 115. Alternative methods of charging a user for retrieving content with an information access device 100 may involve a secure prepaid mechanism, which may for instance be invoked by a PIN provided to the further interface 120, a smart card, a disk or chip card that contains a prepaid currency, a barcode that can be scanned into the device to replenish funds, a credit card verification terminal and so on. To this end, the information access device 100 may comprise a suitable peripheral device 175. In case of a PIN or barcode being used to identify the prepaid service user, the information access device 100 may debit the account of the user through a billing server over the network. The user may be requested to manually terminate a charged service, e.g. by pressing a log-out button.

The information access device 100 may further be used to support transactions over a network, e.g. the Internet 450. For instance, the information request may comprise the retrieval of one or more forms over the network, which may be subsequently filled out by the user, either electronically or by hand and returned to the provider of the forms to complete the transaction, e.g. by sending the electronically generated form or scanning and sending the hand-written form.

As previously mentioned, the information access device 100 may store one or more user profiles. The profile could contain relevant details necessary to carry out an on-line transaction, such as a bank account number or credit details. Other forms of user identification information, e.g. a photograph, may also be stored in such a profile. Such user identification information could for instance be used to purchase an airline ticket incorporating the photograph. This would offer an improved level of security of the ticket.

In an embodiment, the e-ticket service provider would first provide status information, e.g. ticket availability and price, and request an order confirmation from the user. The service could provide the additional information to a printer or a display of the information access device 100, e.g. different codes for different transaction options, and allow the user to type in the code to complete the transaction.

The information access device 100 may further be used to request content that is not available on-line, such as some document or service from an agency which could be a government body or a private organization. Such requests, when made in person or in writing, may sometimes take several days to complete. This may force a user to repeatedly check the status of request and seek confirmation of the completion of the task. However, as shown in FIG. 5, when using an information access device 100, the user may request content, e.g. a document, in step 510, after which the authority from which the content is requested decides in step 520 whether the content can be made available to the user. If the request is honored, the relevant document is sent by e-mail to the user as indicated in step 530. If the device 100 is setup to print out incoming email automatically, the user would need only to look at the printer's out-tray to know if the document requested has arrived.

The information access device 100 may further be arranged to provide access to files on a file server, which may be a remote or a local computer. For example, the document 'Assignment 4' may be stored on a LAN. When accessing this file from a remote location, the user may request access to this document by entering a string such as: 'www.SHS.Bangalore.edu/mike.brown/Assignment 4'. In case the LUC is customized to the user logged in, through a user profile, the short-cut "Assignment 4" can be used instead of the URL shown above.

The information access device 100 may advantageously be used in educational testing, e.g. in schools or universities. The information access device 100 could provide a user with an automated test by printing a question paper from a requested source. This question paper may contain readable questions and a machine-readable 2D barcode indicating the correct answer, and as an option, machine-readable comments related to anticipated incorrect answers.

The user would mark his answers using machine readable symbols such as tick marks, block capitals, and/or clearly written numbers placed at appropriate places, e.g. inside predefined boxes. The information access device 100 may be arranged to scan all machine readable information, including the 2D barcode, and to process this information, thereby grading the paper automatically. The information access device 100 may further be arranged to print out a feedback sheet for the user to aid the user in understanding his test result.

The information access device 100 may use its network interface 110 to act as a thin client and deliver a richer set of services and applications on demand, going beyond what is provided for by the information access device 100 alone. In this embodiment, a remote server is arranged to execute at least some of the more resource-demanding computations or data access. The remote server may be arranged to also incorporate the interpretation layer 120. This would enable a richer set of functions to be available to the user, at the cost of making the interface more complex. Alternatively, the server could act as an Internet gateway to the information access device 100, performing valuable functions such as converting content into a different format such as XHTML-Print. The conversion into XHTML-Print format would enable the information access device 100 to directly print incoming information.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware and software comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An information access device, comprising:
an interface to connect the information access device to a network;
a user interface to provide the information access device with a string of information request indicators;
an interpretation layer to interpret the information request indicators, to extract an information source from the string, and to generate an instruction based upon the interpretation and extraction;
a different application of the device to retrieve information from the information source in response to the generated instruction; and
a processor for executing the generated instruction.

2. The information access device according to claim 1, wherein the interpretation layer comprises:
a first database to store at least one of a user profile and information access device geographic location information;
a second database to store a plurality of instructions; and
a query algorithm to receive said string and to retrieve at least one instruction from the second database wherein the at least one instruction is based on said string and the at least one of the user profile and information access device geographic location information.

3. The information access device according to claim 2, wherein the user profile comprises user credit source information.

4. The information access device according to claim 1, further comprising a display to display information, wherein the processor is further arranged to provide the display with an execution result.

5. The information access device according to claim 4, wherein the interpretation layer is arranged to display a plurality of potential information sources to a user, and is further arranged to generate the instruction in response to the user selecting the information source from the plurality of potential information sources.

6. The information access device according to claim 1, wherein the string comprises a uniform resource locator or a set of Internet search keywords.

7. The information access device according to claim 1, further comprising a scanner, wherein the string comprises a scanning instruction indicator and wherein the generated instruction includes scanning.

8. The information access device according to claim 1, further comprising a printer, wherein the string comprises a printing instruction indicator, and wherein the processor is arranged to instruct the printer to print the retrieved information.

9. The information access device according to claim 1, wherein the interface to connect the information access device to the network comprises an interface to connect to an external device providing network access.

10. The information access device according to claim 1, wherein the information access device is a modular device, comprising:
 a first module to implement the interpretation layer and the processor; and
 a second module to implement the interface and the user interface.

11. The information access device according to claim 10, which comprises a display to display the retrieved information.

12. The information access device according to claim 10, wherein the second module is configured to access a network server, wherein the network server is arranged to impose a pay charge on the information retrieval to the user of the second module.

13. The information access device according to claim 1, further comprising user credit identification means, wherein access to the device is provided in response to user credit identification that enables charging the user.

14. The information access device according to claim 1, wherein the user interface is further arranged to provide the information access device with user identification information prior to providing the information access device with the string.

15. The information access device according to claim 14, wherein the interpretation layer is adapted in response to the user identification information.

16. The information access device according to claim 15, wherein the adaptation comprises the generation of an instruction for retrieving the information from an information source selected on the basis of the user identification information.

17. The information access device according to claim 1, wherein the information source is located on a server.

18. The information access device according to claim 1, further comprising a database of the interpretation layer to store shortcuts and corresponding syntactically meaningful strings, and the interpretation layer is to interpret the information request indicators as a shortcut, to map the shortcut to a syntactically meaningful string using the database, to extract the information source from the syntactically meaningful string.

19. The information access device according to claim 1 wherein the information request indicators include short cut commands to access a resource on the device, to open a program on the device, to print, to scan, to file, to email, or combinations thereof.

20. An information access device, comprising:
 an interface to connect the information access device to a network;
 a user interface to provide the information access device with a string of information request indicators;
 an interpretation layer to interpret the information request indicators as a shortcut, to map the shortcut to a syntactically meaningful string, to extract an information source from the syntactically meaningful string, and to generate an instruction, based upon the interpretation and extraction, for retrieving information from the information source; and
 a database of the interpretation layer to store shortcuts and corresponding syntactically meaningful strings;
 the device further being arranged to forward said instruction to a network server, said server comprising a processor for executing the generated instruction.

21. A computer program product including a non-transitory, tangible computer readable storage medium having computer readable instructions embedded thereon, the computer readable instructions arranged to, when being executed by a processor of an information access device, cause the processor to:
 interpret information request indicators received in a string of information request indicators from a user interface of the information access device;
 extract an information source from the string of information request indicators;
 generate an instruction for retrieving information from the information source; and
 trigger a different application of the device to retrieve the information from the information source in response to the generated instruction.

* * * * *